US005194230A

United States Patent [19]

PeKarna et al.

[11] Patent Number: 5,194,230

[45] Date of Patent: Mar. 16, 1993

[54] SOLID PRODUCT STATIC BRAKE FOR SOLID BLOCK CHEMICAL DISPENSERS

[75] Inventors: Matthew D. PeKarna, Plymouth; Greg M. Grandprey, Circle Pines; John M. Lavorata, Burnsville; Daniel K. Boche, Eagan, all of Minn.

[73] Assignee: Ecolab Inc., St. Paul, Minn.

[21] Appl. No.: 801,693

[22] Filed: Dec. 2, 1991

[51] Int. Cl.$^5$ .................... B01D 12/00

[52] U.S. Cl. .................... 422/263; 422/266; 422/274; 422/275; 422/276; 222/630; 239/315; 239/316; 211/50; 248/523

[58] Field of Search .................... 422/263, 266, 274–276, 422/278, 102, 104; 222/630, 637; 239/315, 316; 211/50, 51; 248/500, 510, 316.7, 523

[56] References Cited

U.S. PATENT DOCUMENTS

| | | | |
|---|---|---|---|
| Re. 32,818 | 1/1989 | Fernholz et al. | 252/90 |
| 2,743,499 | 5/1956 | Edgerton | 248/523 |
| 2,965,016 | 12/1960 | Price | 211/50 |
| 2,986,340 | 5/1961 | Webb | 239/315 |
| 3,241,524 | 3/1966 | Torson | 248/523 |
| 3,282,073 | 11/1966 | Zehrbach | 222/630 |
| 3,507,624 | 4/1970 | Schneider et al. | 23/271 |
| 3,684,457 | 8/1972 | Pinto et al. | 422/278 |
| 4,426,362 | 1/1984 | Copeland et al. | 422/263 |
| 4,690,305 | 9/1987 | Copeland | 222/52 |
| 4,842,729 | 6/1989 | Buchan | 422/263 |
| 4,964,518 | 10/1990 | Wilson | 211/50 |

FOREIGN PATENT DOCUMENTS

| | | | |
|---|---|---|---|
| 231603 | 8/1987 | European Pat. Off. . | |
| 2226233 | 5/1990 | United Kingdom | 15/44 |

OTHER PUBLICATIONS

"Solid Choice" Product Disclosure (Ecolab), 1987.

"Solid Choice Dispenser Installation and Operation Manual" (Ecolab), 1987.

*Primary Examiner*—Robert J. Warden

*Assistant Examiner*—Laura E. Collins

*Attorney, Agent, or Firm*—Merchant, Gould, Smith, Edell, Welter & Schmidt

[57] ABSTRACT

A solid product static brake (10) is provided which is employed in cast solid chemical block dispensing systems for slowing a generally downward gravitationally driven movement of the solid chemical block when placed or installed in a chemical dispenser. The brake provides the ability to prevent the destruction of the cast solid during installation due to mechanical shock. The static brake comprises a horizontal base frame (12), and a plurality of rigid blade members (18) extending from the base frame in a generally perpendicular direction. When a new solid block is installed, the blade members contact and slow the solid block as it falls into the dispenser.

37 Claims, 3 Drawing Sheets

FIG. 3
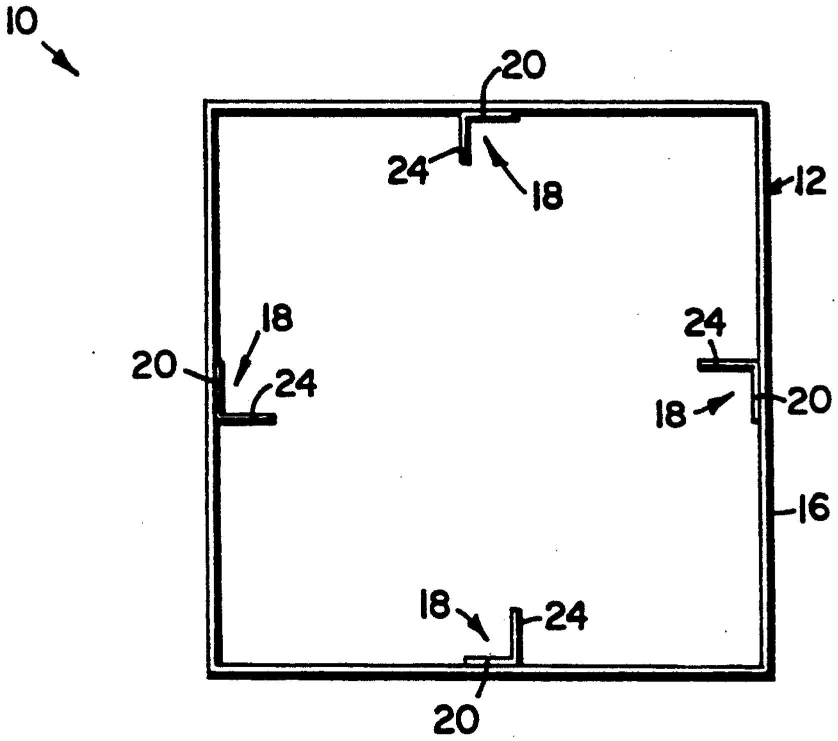
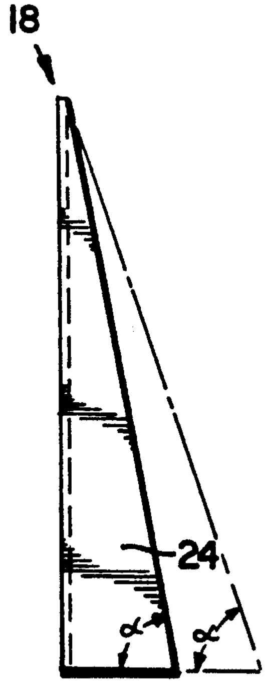
FIG. 5
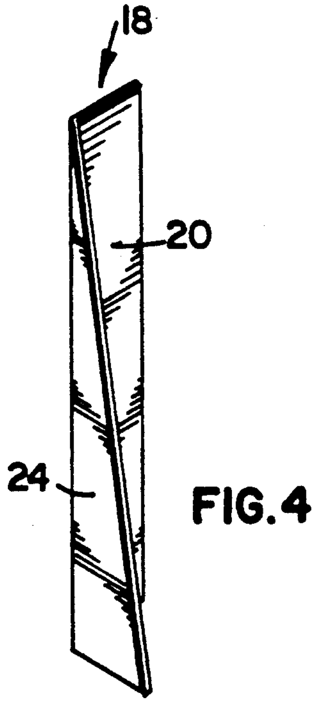
FIG. 4

SOLID PRODUCT STATIC BRAKE FOR SOLID BLOCK CHEMICAL DISPENSERS

FIELD OF THE INVENTION

The invention generally relates to chemical dispensing systems, and more particularly is a static brake for cast solid block chemical products, which can be employed in a solid block chemical dispenser for slowing a generally downward gravitationally driven movement of a solid chemical block composition placed in the open receptacle of the dispenser.

BACKGROUND OF THE INVENTION

Industrial warewashing and laundry machines generally comprise a wash tank which contains a cleaning solution for the wash process. In this process, the wash load is contacted with the cleaning solution and subsequently with rinse water which falls into the wash tank. With each cycle, the cleaning power of the cleaning solution is reduced, first because some is exhausted by the soil removing process and, second, because it is diluted with rinse water. The cleaning solution is therefor recharged from time to time by adding fresh cleaning liquid from a dispenser system which usually provides a concentrated aqueous solution of an alkaline and/or surfactant based chemical composition. These chemical compositions are typically provided in solid form and are stored in the dispenser housing.

A number of techniques are known for converting the solid chemicals into a concentrated solution, dependant on the solid. For example, solid powder chemicals can be dissolved by placing them on a sieve and spraying water onto the sieve from below. Alternatively, the powder material can be dissolved in a dispenser of the "water-in-reservoir" type, in which the powder material is submerged under water, which thereafter becomes bloated or even saturated with the powder. When more water is added, the excess solution flows into an overflow pipe leading to the washing machine. It is also possible to use solid detergent materials in the form of briquettes in the water-in-reservoir type of dispenser.

A more recent type of solid chemical is the solid cast or block form, in which a solid block is formed by pouring a concentrated aqueous slurry into a container, in which it solidifies upon cooling as a result of the hydration of the salts in the composition. Some solid blocks cast in containers require dispensing systems in which solvent is sprayed onto the block while it is inside the container, thereby dissolving the exposed surface to form a concentrated solution. When the solid blocks are not used in the same container in which they were cast, various dispensing systems can be employed. For example, European Patent Application No. 231,603, discloses a dispenser comprising a three dimensional screen on which a solid detergent block is supported, and a spray means is employed to impinge upon the solid block through the screen from below.

Dispensers for solid blocks of chemical such as detergents and lubricants are also employed in which multiple numbers of blocks can be disposed within the dispenser cavity, in which the blocks are dropped into the open cavity from above. The solid block chemical products typically are provided in 5 gallon drum containers having a weight of about 50 pounds. In a typical operation, a cast solid block product is released from a container such as a five gallon bucket, dropping into a compartment or receptacle of a dispenser. The product is dropped approximately 16 inches requiring the dispenser sub unit or main tank unit to absorb the initial impact shock. When such solid blocks are allowed to fall into the dispenser cavity, they free fall into the dispenser and often cause structural damage. The impact shock can also disturb electrical components causing misalignments. Also, the solid blocks can become fractured from the fall resulting in particles or extruded pieces falling into the lower sump of the dispenser, which in turn causes an uncontrolled concentration overshoot condition.

Therefore, there is a need for a braking type device which prevents the damage caused by the free fall of solid blocks of chemical into the receptacles of solid block chemical dispensers.

SUMMARY OF THE INVENTION

The present invention is a solid product static brake for slowing the generally downward gravitationally driven movement of a solid chemical block composition when placed or installed in a dispenser. The static brake comprises a horizontal base frame defining a perimeter, and a plurality of rigid blade members extending from the horizontal base frame in a generally perpendicular direction to the base frame. The blade member has an inwardly directed edge from the perimeter of the base frame. The static brake can be employed in a solid block chemical dispensing system which comprises a dispenser having a housing which defines an inner cavity including a storage portion for the solid block chemical composition. A flat horizontal screen support is mounted in the storage portion of the housing and a spray nozzle is mounted inside the housing. The static brake is disposed within the housing, and prevents the solid block from striking the screen support when the solid block is placed in the dispenser.

The static brake of the invention prevents a solid product, such as a solid detergent block from free falling into the dispenser, thus preventing structural damage and reducing the impact shock that may disturb the electrical components in the dispenser. The static brake also prevents the solid product from getting fractured particles or extruded pieces into the lower sump of the dispenser, preventing an uncontrolled concentration overshoot condition.

The present invention may be used for any solid block product that is released from any size package or container, such as a five gallon bucket. The static brake of the invention can be employed in dispensers where the solid product is dropped into the cavity of the dispenser. For example, a five gallon bucket filled with solid chemical product is inverted over the opening of the dispenser which can optionally have a lip on which the pail can be placed. The solid block product is released from the pail and slides along the static brake blade members, which are preferably tapered and have support members, with the solid block product stopping above the water permeable screen support. The taper angle of the blade members may be increased or decreased to accommodate the hardness of the solid block product. As the product hardness increases, the taper angle may be increased to allow the product to slide along the blade members to the desired point in the dispenser. As the product hardness decreases, the taper angle may be decreased in order for the product to reach the desired point in the cavity of the dispenser without striking the screen support.

One aspect of the invention is the novel solid product static brake which can be employed in solid chemical dispensing systems. A further aspect of the invention is a solid block chemical dispensing system employing the static brake. Another aspect of the invention is a method of dispensing a chemical solution from a dispenser utilizing the solid product static brake.

BRIEF DESCRIPTION OF THE DRAWINGS

FIG. 3 is a top view of the static brake shown in FIG. 1.

FIG. 4 is a front perspective view of one of the blade members of the static brake shown in FIG. 1.

FIG. 5 is an end view of the blade member shown in FIG. 4.

DETAILED DESCRIPTION OF THE INVENTION

The invention is a static brake apparatus for slowing the generally downward gravitationally driven movement of a solid block chemical composition when placed in a dispenser. The static brake comprises a horizontal base frame defining a perimeter, and a plurality of rigid blade members extending from the horizontal base frame in generally perpendicular direction to the base frame. The blade members have an inwardly directed edge from the perimeter of the base frame. The blade members preferably have a tapered edge and a support member. It is contemplated that the horizontal base frame can be formed so it is a portable base for the blade members which can be easily removed from a dispenser, or the base frame can be a portion of the dispenser housing which supports the blade members permanently. A solid block chemical dispensing system employing the static brake of the invention comprises a dispenser for dispensing an aqueous chemical solution to a utilization point from a solid block of chemical disposed in the dispenser and resting on the static brake.

The drawings depict various preferred embodiments of the invention which can be formed in a variety of ways. While the description will proceed with respect to such drawings, it will be readily understood by those skilled in the art that such descriptions and drawings are used to explain the novel features of this invention, rather than in any limiting sense.

Figure 1:
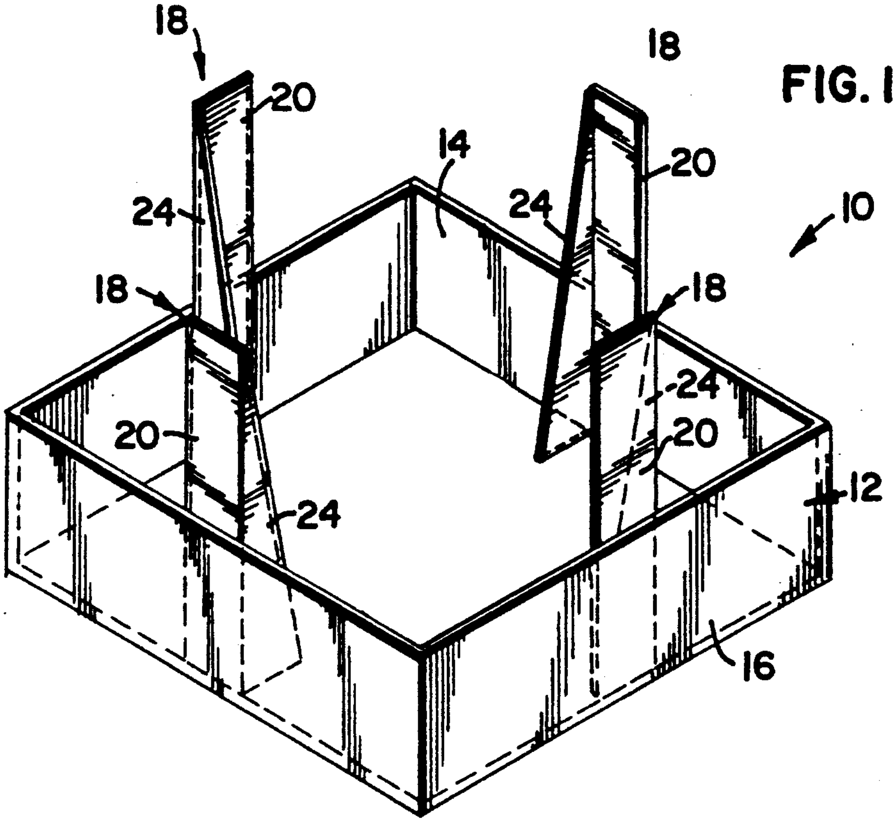
FIG. 1 is a front elevational perspective view of one embodiment of the static brake of the invention.
Figure 2:
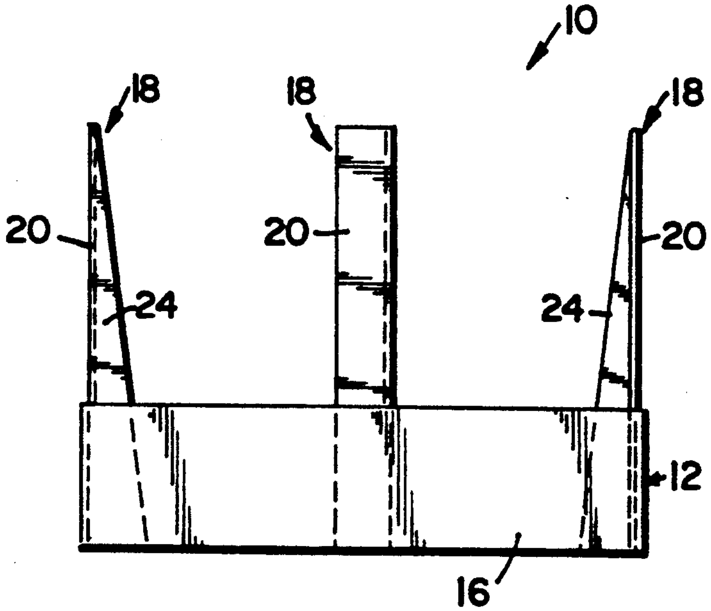
FIG. 2 is a side view of the static brake shown in FIG. 1.

Referring to FIGS. 1-3 of the accompanying drawings, a first preferred embodiment of the static brake of the present invention is depicted therein. Static brake 10 comprises a horizontal base frame 12 defining a perimeter and having an inner surface 14 and an outer surface 16. Rigid blade members 18 extend in a generally perpendicular direction from the inner surface 14 of base frame 12. Rigid blade members 18 have a triangular tapered edge 24 and rectangular support members 20 which are attached to and protrude from opposing sides of inner surface 14 of frame 12. The support members 20 are disposed on frame 12 so that tapered edge 24 of blade members 18 extend inwardly from inner surface 14 and are generally perpendicular to adjacently disposed blade member edges. The support members 20 may be attached to the inner surface 14 of frame member 12 by a variety of means such as spot welding, bolting, etc.

The static brake 10, including the frame 12 and blade members 18 may be formed of any rigid material that will withstand contact with strong chemical compositions such as caustic detergents. A variety of metallic substances may be employed as well as rigid plastic materials which will withstand contact with caustic chemicals. A particularly preferred material for use in making the static brake is stainless steel.

Referring to FIGS. 4 and 5 of the drawings, the blade members 18 may be formed so that they have a variety of tapered edges 24 by increasing or decreasing the taper angle alpha ($\alpha$) to accommodate the hardness of the chemical solid block product. For example, in FIG. 5, the taper angle $\alpha_1$ is greater so that the slope of tapered edge 24 is steeper to accommodate a solid chemical block which is quite hard, while the taper angle $\alpha_2$ is less than $\alpha_1$ so that the slope of tapered edge 24 is less to accommodate a softer solid block chemical product. Varying the taper angle to accommodate the hardness of a solid block product allows different products to be stopped at about the same point in a dispenser by the static brake employed in the dispenser. The static brake blade members 18 can be formed with a taper angle from about 60° to about 85°, preferably from about 70° to about 80°.

Figure 6:
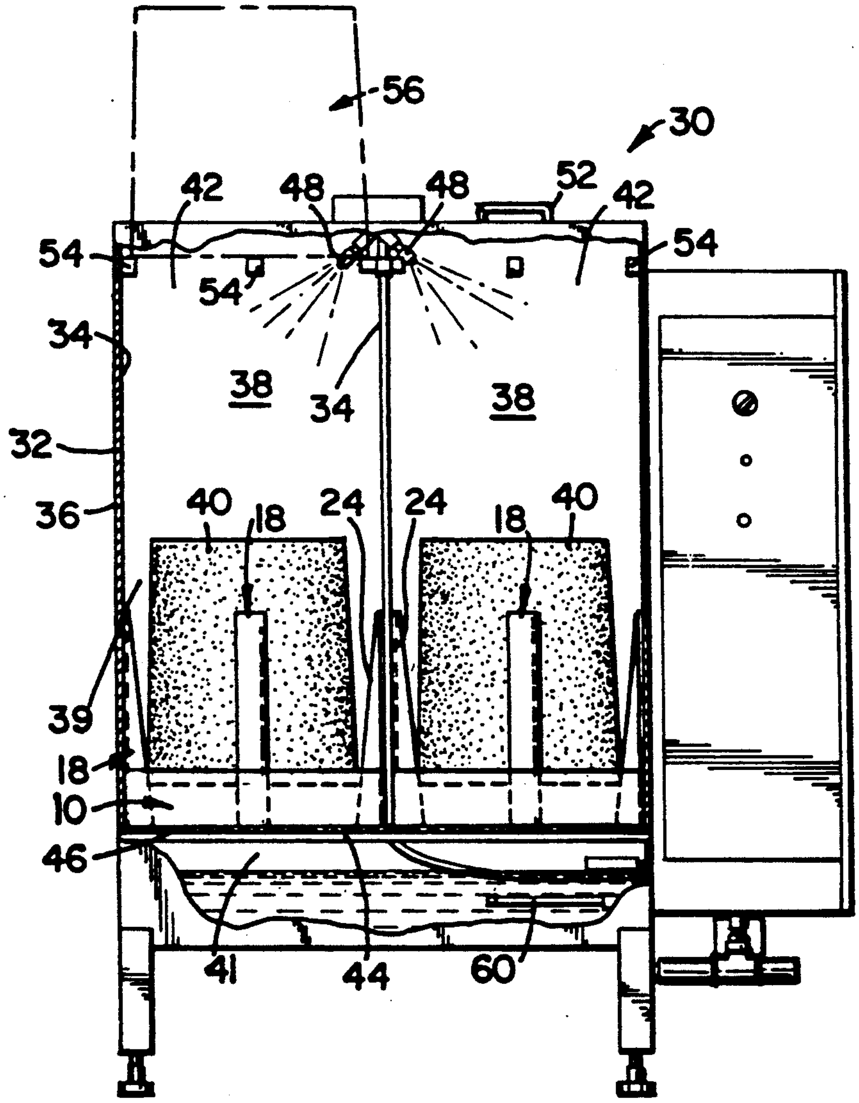
FIG. 6 is a side view of a solid block chemical dispenser having its housing partially broken away to show the static brake of FIG. 1.

Referring to FIG. 6 of the accompanying drawings, a typical dispenser 30 for solid block chemical products is depicted in which the static brake 10 of the invention is employed in inner cavity 38 of multiple subunits of the dispenser 30. The dispenser 30 comprises a housing 32 having an inner surface 34 and an outer surface 36. The housing defines a substantially enclosed inner cavity 38 comprising a storage portion 39 and a collector portion 41, as well as an access port 42 and a discharge port 44 which open into cavity 38. Flat horizontal screen support 46 is mounted in the storage portion 39 of dispenser 30. A spray nozzle 48 is mounted on inner surface 34 of housing 32 above screen support 46. In an alternate embodiment (not shown), nozzle 48 may be disposed below screen support 46 so that the water spray therefrom contacts the solid chemical product 40 on the lower side facing the screen support 46. The static brake 10 is disposed within the storage portion 39 of cavity 38 defined by housing 32. The static brake 10 rests on the upper surface of screen support 46 when it is placed within dispenser 30. The static brake 10 is disposed within the dispenser 30 so that the respective tapered edges 24 of blade members 18 extend inwardly from the respective inner surface 34 of housing 32 in a generally perpendicular direction from inner surface 34. A door 52 is disposed over access port 42 and is pivotally attached to housing 32 to allow opening and closing of the access port 42 with door 52. A plurality of lip members 54 may be attached to inner surface 34 of housing 32 in the area defining the access port 42. A pail or bucket 56 (phantom view) may rest on lip members 54 when it is inverted over access port 42 to allow the solid block chemical 40 to enter into the inner cavity 38 of dispenser 30.

In an alternate embodiment (not shown), blade members 18, depicted in FIGS. 4 and 5, may be attached directly to inner surface 34 of housing 32 of dispenser 30 above screen support 46 without employing frame 12 so that tapered edges 24 extend inwardly from inner surface 34 in a generally perpendicular direction. The support members 20 of blade members 18 may be attached to inner surface 34 of housing 32 by a variety of means such as spot welding, bolting, etc.

A method of dispensing a chemical solution from a solid block chemical disposed in a container having an open face and covered by a lid, comprises the steps of removing the lid from the container, inverting the container over the upwardly disposed access port 42 of dispenser 30 having housing 32 defining a cavity 38 such that the open face of the container is down. The dispenser has the static brake of the invention described above disposed within the housing 32 on screen support 46 for slowing the generally downward gravitationally driven movement of the solid chemical block 40 when it is released from the container 56. The solid block 40 is then allowed to fall from the container as a single unit into the cavity 38 of dispenser 30. Water is then sprayed from the nozzle 48 upon the solid block of chemical 40, dissolving the chemical contacted with the water such that it passes through the screen support 46 to the collector portion 41 of dispenser 30 and through an outlet 60 to a utilization point. The container having an open face preferably surrounds and is in contact with the solid block chemical on all but one surface thereof, the cross-sectional area of the open face sufficient to allow passage of the entire solid block therethrough.

The static brake of the invention may be employed in solid block chemical product dispensers for a variety of solid block chemical products. Such solid blocks of chemical are used in industrial cleaning processes such as fabric washing and warewashing, and generally comprise alkaline agents, detergents, builders, etc. The solid blocks of chemical can also be formed from lubricating agents in concentrated form which can be dissolved with water to form lubricants useful in areas such as conveyor systems. Suitable solid block products include various warewashing solid block chemical products, laundry detergent solid block products, concentrated lubricant solid blocks such as conveyer lubricants, etc. Such chemical blocks typically come in five gallon buckets or pails which in operation are inverted over the open dispenser allowing the solid block of chemical to free fall into the dispenser.

The dispenser 30 depicted in FIG. 6 contains four separate cavities or sub-units for the chemical blocks, two in front as shown and two behind (not shown). However, any number of storage cavities can be employed with each cavity containing the static brake of the invention. The present solid product static brake slows the free falling solid block so that it rests at least 2 inches, preferably 3 to 5 inches, above screen support 46 in dispenser 30.

The solid product static brake of the invention prevents a solid block chemical product, such as a solid detergent block, from free falling into a dispenser, preventing structural damage and reducing the impact shock that may disturb electrical components in the dispenser. The static brake also prevents the solid product from getting fractured or extruded pieces into the lower sump or collector portion of the dispenser, which can happen as a result of the impact of free falling solid blocks striking the screen support, preventing an uncontrolled concentration overshoot condition.

The foregoing discussion is illustrative of the invention. However, since many embodiments of the invention can be made without departing from the spirit and scope of the invention, the invention resides wholly in the claims hereinafter appended.

We claim:

1. A static brake for slowing the generally downward gravitationally driven movement of a solid chemical block composition when placed in a dispenser, said static brake comprising:

(a) a horizontal base frame defining a perimeter and a central opening therein;

(b) a plurality of rigid blade members extending from said horizontal base frame in a generally perpendicular direction to said horizontal base frame, said blade members rigidly attached to said horizontal base frame;

wherein said blade members have an inwardly directed tapered edge extending from said perimeter of said horizontal base frame into said opening.

2. The static brake of claim 1, wherein said static brake is made of a metallic substance.

3. The static brake of claim 2, wherein said static brake is made of stainless steel.

4. The static brake of claim 1, wherein said tapered edge of said blade members is formed with a taper angle of about 60° to about 85°.

5. The static brake of claim 1, wherein said horizontal base frame comprises a portion of a housing of a solid block chemical dispenser.

6. The static brake of claim 1, comprising four blade members, each blade member having a triangular tapered edge and a support member.

7. A solid block chemical dispensing system, comprising:

(a) a dispenser for dispensing an aqueous chemical solution to a utilization point from a solid block chemical composition, said dispenser comprising:

(i) a housing having an inner surface and an outer surface, said housing defining a substantially enclosed inner cavity comprising a storage portion and a collector portion, said housing also defining an upwardly disposed access port;

(ii) a flat horizontal screen support mounted in the storage portion of said housing; and (iii) a spray nozzle mounted on said inner surface of said housing; and (b) a static brake disposed within said housing of said dispenser above said screen support for slowing the generally downward gravitationally driven movement of a solid block chemical composition when placed in the inner cavity of said dispenser, said static brake comprising:

(i) a horizontal base frame defining a perimeter and a central opening therein; and (ii) a plurality of rigid blade members extending from said horizontal base frame in a generally perpendicular direction to said horizontal base frame, said blade members rigidly attached to said horizontal base frame, said blade members having an inwardly directed tapered edge extending from said perimeter of said horizontal frame into said opening;

wherein said static brake prevents a solid block chemical composition from striking said screen support mounted in the storage portion of said housing when said solid block is placed in said dispenser.

8. The dispensing system of claim 7, wherein said spray nozzle is mounted in the storage portion of said housing on the inner surface of said housing.

9. The dispensing system of claim 7, wherein said spray nozzle is mounted in the collector portion of said housing below said screen support on the inner surface of said housing.

10. The dispensing system of claim 7, wherein said dispenser further comprises a door operatively engaged to the hosing and positioned across the upwardly disposed access port.

11. The dispensing system of claim 7, wherein said dispenser further comprises a plurality of lip members protruding from the inner surface of said housing for supporting a container having a solid block chemical composition within the container.

12. The dispensing system of claim 7, wherein said static brake is made of a metallic substance.

13. The dispensing system of claim 12, wherein said static brake is made of stainless steel.

14. The dispensing system of claim 7, wherein said tapered edge of said blade members is formed with a taper angle of about 60° to about 85°.

15. The dispensing system of claim 7, wherein said static brake comprises four blade members, each blade member having a triangular tapered edge and a support member.

16. A solid block chemical dispensing system, comprising:

(a) a dispenser for dispensing an aqueous chemical solution to a utilization point from a solid block chemical composition, said dispenser comprising:
  (i) a housing having an inner surface and an outer surface, said housing defining a substantially enclosed inner cavity comprising a storage portion and a collector portion, said housing also defining an upwardly disposed access port;
  (ii) a flat horizontal screen support mounted in the storage portion of said housing; and
  (iii) a spray nozzle mounted on said inner surface of said housing; and
(b) a static brake disposed within said housing of said dispenser above said screen support for slowing the generally downward gravitationally driven movement of a solid block chemical composition when placed in the inner cavity of said dispenser, said static brake comprising a plurality of rigid blade members attached to said housing inner surface, said blade members having a support member and a triangular tapered edge extending inwardly from said inner surface;

wherein said static brake prevents a solid block chemical composition from striking said screen support mounted in the storage portion of said housing when said solid block is placed in said dispenser.

17. The dispensing system of claim 16, wherein said dispenser further comprises a plurality of lip members protruding from the inner surface of said housing for supporting a container having a solid block chemical composition within the container.

18. The dispensing system of claim 16, wherein said static brake is made of a metallic substance.

19. The dispensing system of claim 16, wherein said static brake is made of stainless steel.

20. The dispensing system of claim 16, wherein said blade members are formed with a taper angle of about 60° to about 85°.

21. A method of dispensing a chemical solution to a utilization point from a solid block chemical composition disposed in a container having an open face and covered by a lid, comprising the steps of:

(a) removing a lid from a container;
(b) inverting the container over an upwardly disposed access port of a dispenser such that an open face of the container is down, said dispenser comprising a housing defining an inner cavity having a storage portion and a collector portion, said dispenser having a static brake for slowing the downward gravitationally directed movement of a solid block when it is released from said container into said dispenser, said static brake disposed within said housing on a flat horizontal screen support, said static brake comprising:
  (i) a horizontal base frame defining a perimeter and a central opening therein;
  (ii) a plurality of rigid blade members extending from said horizontal base frame in a generally perpendicular direction to said horizontal base frame, said blade members rigidly attached to said horizontal base frame, said blade members having an inwardly directed tapered edge extending from said perimeter of said horizontal base frame into said opening;
(c) allowing the solid block to fall from the container as a single unit into the dispenser, said solid block sliding downwardly against said blade members which stop said solid block before it reaches said screen support; and
(d) spraying water upon the solid block, thereby dissolving the chemical in contact with the water which then passes through the screen support to the collector portion of the housing and is directed to a utilization point.

22. The method of claim 21, wherein said container having an open face surrounds and is in contact with said solid block on all but one surface thereof, the cross-sectional area of the open face sufficient to allow passage of the entire solid block therethrough.

23. The method of claim 21, wherein upon insertion of the solid block into the dispenser, the solid block is separated from the container and inserted into the dispenser through the access port and retainably held by said blade members of said static brake at least about 2 inches above said horizontal screen support.

24. The method of claim 21, wherein said solid block comprises a cast solid detergent block.

25. The method of claim 24, wherein said solid block comprises a cast solid warewash or laundry detergent composition.

26. The method of claim 21, wherein said solid block comprises a concentrated solid lubricant composition.

27. The method of claim 26, wherein said solid lubricant is a conveyor lubricant.

28. The method of claim 21, wherein said static brake is made of a metallic substance.

29. The method of claim 28, wherein said static brake is made of stainless steel.

30. The method of claim 21, wherein said tapered edge of said blade members is formed with a taper angle of about 70° to about 80°.

31. The method of claim 21, wherein said static brake comprises four blade members, each blade member having a triangular tapered edge and a support member.

32. A method for slowing the generally downward gravitationally driven movement of a solid chemical block composition when placed in a dispenser, comprising the step of disposing a static brake in a dispenser, said static brake comprising:

(a) a horizontal base frame defining a perimeter and a central opening therein; and (b) a plurality of rigid blade members extending from said horizontal base frame in a generally perpendicular direction to said horizontal base frame, said blade members rigidly attached to said horizontal base frame, said blade members having an inwardly directed tapered edge extending from said perimeter of said horizontal base frame into said opening;

wherein said tapered edge of said blade members contacts and penetrates the solid chemical block to slow the generally downward movement of the solid chemical block.

33. The method of claim 32, wherein said static brake is made of a metallic substance.

34. The method of claim 33, wherein said static brake is made of stainless steel.

35. The method of claim 32, wherein said tapered edge of said blade members is formed with a taper angle of about 60° to about 85°.

36. The method of claim 32, wherein said horizontal base frame comprises a portion of a housing of a solid block chemical dispenser.

37. The method of claim 32, wherein said static brake comprises four blade members, each blade member having a triangular tapered edge and a support member.

* * * * *